US 011172696B2

(12) United States Patent
Cretors

(10) Patent No.: US 11,172,696 B2
(45) Date of Patent: Nov. 16, 2021

(54) POPCORN MACHINES HAVING REMOVABLE KETTLE ASSEMBLIES

(71) Applicant: C. Cretors & Company, Wood Dale, IL (US)

(72) Inventor: Charles D. Cretors, Lake Forest, IL (US)

(73) Assignee: C. Cretors & Company

( * ) Notice: Subject to any disclaimer, the term of this patent is extended or adjusted under 35 U.S.C. 154(b) by 139 days.

(21) Appl. No.: 16/392,557

(22) Filed: Apr. 23, 2019

(65) Prior Publication Data
US 2020/0337343 A1 Oct. 29, 2020

(51) Int. Cl.
*A23L 7/187* (2016.01)
*A47J 27/14* (2006.01)
(Continued)

(52) U.S. Cl.
CPC ............... *A23L 7/187* (2016.08); *A23L 5/12* (2016.08); *A23P 30/38* (2016.08); *A47J 27/004* (2013.01);
(Continued)

(58) Field of Classification Search
CPC ..... A23L 5/10–5/11; A23L 5/15; A23L 7/161; A23L 7/174–7/187; A23L 5/12;
(Continued)

(56) References Cited

U.S. PATENT DOCUMENTS

| 884,771 A | 4/1908 | Snow |
| 1,251,291 A | 12/1917 | Scheeffer |
| (Continued) | | |

FOREIGN PATENT DOCUMENTS

| CN | 2363205 Y | 2/2000 |
| CN | 2865302 Y | 2/2007 |
| (Continued) | | |

OTHER PUBLICATIONS

"Induceramic, infrared honeycomb ceramic burner plate, using Wayback Machine," retrieved from https://web.archive.org/web/20140228035423/http://www.induceramic.com/industrial-ceramics-application/machinery-and-industrial-equipment/coating-equipment/infrared-honeycomb-ceramic-burner-plate, (Year: 2014), 4 pages.
(Continued)

*Primary Examiner* — Drew E Becker
(74) *Attorney, Agent, or Firm* — Perkins Coie LLP

(57) ABSTRACT

Popcorn machines having easily removable popping kettle assemblies are described herein. In some embodiments, a popcorn machine configured accordance with the present technology includes a cabinet and a pair of kettle supports mounted within the cabinet. A kettle assembly is configured to be positioned on the kettle supports and to pop popcorn placed in a kettle of the kettle assembly when the kettle assembly is in a popping position, and to discharge the popcorn when the kettle assembly is moved from the popping position to a dumping position. The kettle assembly can be lifted off the kettle supports in the popping position to facilitate removal of the kettle assembly from the cabinet for maintenance, cleaning, repair, replacement, etc. In some embodiments, the kettle assembly can be stopped in the dumping position.

20 Claims, 7 Drawing Sheets

(51) Int. Cl.
*A47J 37/10* (2006.01)
*A23L 5/10* (2016.01)
*A23P 30/38* (2016.01)
*A47J 36/34* (2006.01)
*A47J 27/00* (2006.01)

(52) U.S. Cl.
CPC ............ *A47J 27/14* (2013.01); *A47J 36/34* (2013.01); *A47J 37/105* (2013.01); *A23V 2002/00* (2013.01)

(58) Field of Classification Search
CPC ..... A23V 2002/00; A47J 36/16; A47J 27/004; A47J 36/34; A47J 37/108; A47J 37/105; A47J 27/14; A23P 30/30–30/38
USPC .......................................... 99/323.9, 323.11
See application file for complete search history.

(56) References Cited

U.S. PATENT DOCUMENTS

| | | |
|---|---|---|
| 1,308,241 A | 7/1919 | Hutchinson |
| 1,339,662 A | 5/1920 | Morgan |
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,786,877 A | 12/1930 | Thompson |
| 1,880,822 A | 10/1932 | Cook et al. |
| 1,898,968 A * | 2/1933 | Wyland ............... A23L 7/187 222/166 |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A | 4/1951 | Gibson |
| 2,570,126 A | 10/1951 | Hobbs |
| 2,575,643 A | 11/1951 | Tamsen |
| 2,586,347 A | 2/1952 | Kloster |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A * | 10/1959 | Bushway ............. A23L 7/187 99/323.7 |
| 2,918,956 A | 12/1959 | Otto |
| 2,939,379 A | 6/1960 | Schmitt |
| 2,984,169 A * | 5/1961 | Bushway ............. A23L 7/187 99/323.9 |
| 3,095,326 A | 6/1963 | Green et al. |
| D196,811 S | 11/1963 | Lasar |
| 3,120,168 A | 2/1964 | Lippert |
| 3,140,952 A | 7/1964 | Cretors |
| 3,167,453 A * | 1/1965 | Cretors ................ A23G 3/26 118/19 |
| 3,251,579 A | 5/1966 | Lasar |
| 3,280,720 A | 10/1966 | Kuhn |
| 3,291,304 A | 12/1966 | Fuchs |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,569,670 A | 3/1971 | Eff |
| 3,584,585 A | 6/1971 | Hansel et al. |
| 3,697,289 A | 10/1972 | Day et al. |
| 3,739,953 A | 6/1973 | Cretors |
| 3,757,084 A | 9/1973 | Mc et al. |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | VandeWalker |
| 4,206,695 A | 6/1980 | Cretors |
| 4,288,686 A | 9/1981 | Cretors |
| 4,289,079 A | 9/1981 | Swistun |
| 4,329,068 A | 5/1982 | Neuner et al. |
| 4,331,124 A | 5/1982 | Seidel et al. |
| 4,337,584 A | 7/1982 | Johnson |
| 4,345,144 A | 8/1982 | Bergquist |
| 4,417,505 A | 11/1983 | Pietrobelli |
| 4,438,682 A | 3/1984 | King et al. |
| 4,444,553 A | 4/1984 | Christodoulou |
| 4,494,314 A | 1/1985 | Gell, Jr. |
| 4,512,247 A | 4/1985 | Friedman |
| D285,404 S | 9/1986 | Wang |
| 4,648,719 A | 3/1987 | Roben et al. |
| 4,649,263 A | 3/1987 | Goodlaxson |
| 4,658,708 A | 4/1987 | Rastoin |
| 4,702,158 A | 10/1987 | Ishihara |
| D294,448 S | 3/1988 | Otto |
| 4,763,568 A | 8/1988 | Kiczek |
| 4,828,146 A | 5/1989 | Stein |
| 4,881,457 A | 11/1989 | Lyga et al. |
| 5,013,575 A | 5/1991 | Stadler et al. |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,154,161 A | 10/1992 | Rogers et al. |
| 5,176,069 A | 1/1993 | Chen |
| 5,180,898 A | 1/1993 | Alden et al. |
| 5,203,256 A | 4/1993 | Mueller |
| 5,237,912 A | 8/1993 | Fins |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoeberigs |
| 5,332,102 A | 7/1994 | Sennett et al. |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee et al. |
| 5,513,558 A | 5/1996 | Erickson et al. |
| 5,539,671 A | 7/1996 | Albrecht et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,645,878 A | 7/1997 | Breslin et al. |
| 5,662,024 A | 9/1997 | Cretors et al. |
| D384,548 S | 10/1997 | Hsieh |
| 5,690,018 A | 11/1997 | Hansen |
| 5,694,830 A | 12/1997 | Hodgson et al. |
| 5,699,720 A | 12/1997 | Stein et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,857,403 A | 1/1999 | Mann |
| 5,871,792 A | 2/1999 | Weiss et al. |
| 5,890,033 A | 3/1999 | Parker |
| 5,979,301 A | 11/1999 | Perttola |
| 6,000,318 A | 12/1999 | Weiss et al. |
| 6,021,707 A | 2/2000 | Bauer et al. |
| D426,422 S | 6/2000 | Otto |
| 6,082,248 A * | 7/2000 | Turrel ................. A47J 27/14 99/323.11 |
| 6,098,526 A | 8/2000 | Stein et al. |
| 6,123,011 A | 9/2000 | Cretors |
| 6,164,192 A | 12/2000 | Stein et al. |
| 6,164,193 A | 12/2000 | Perttola |

(56) References Cited

U.S. PATENT DOCUMENTS

| | | |
|---|---|---|
| 6,234,063 B1 | 5/2001 | Evers et al. |
| 6,234,064 B1 | 5/2001 | Turrel |
| 6,331,323 B1 | 12/2001 | Adler-Nissen et al. |
| 6,352,731 B1* | 3/2002 | Weiss ............... G07F 17/0078 426/233 |
| 6,374,727 B1 | 4/2002 | Cretors |
| 6,382,087 B1 | 5/2002 | Iiyama |
| 6,412,395 B1 | 7/2002 | Weiss et al. |
| 6,412,396 B1 | 7/2002 | Wright |
| 6,461,033 B2 | 10/2002 | Palmer et al. |
| 6,534,103 B2 | 3/2003 | Weiss |
| 6,578,468 B1 | 6/2003 | Horn |
| 6,612,225 B1 | 9/2003 | Mann |
| 6,619,280 B1 | 9/2003 | Zhou et al. |
| 6,669,304 B2 | 12/2003 | Binning |
| 6,672,201 B2 | 1/2004 | Evans, Sr. et al. |
| 6,872,923 B2 | 3/2005 | Cretors et al. |
| 6,914,226 B2 | 7/2005 | Ottaway |
| 7,082,891 B2 | 8/2006 | Watson |
| 7,259,357 B2 | 8/2007 | Walker |
| 7,285,300 B1 | 10/2007 | Allington et al. |
| 7,721,643 B2 | 5/2010 | Berger et al. |
| 7,874,244 B1 | 1/2011 | Rhome |
| 8,011,622 B1 | 9/2011 | Guthrie |
| 8,201,492 B2 | 6/2012 | Cretors |
| 8,216,622 B2 | 7/2012 | Evans, Sr. et al. |
| D672,789 S | 12/2012 | Bongiovanni |
| 8,464,634 B2 | 6/2013 | Cretors et al. |
| 8,651,014 B2 | 2/2014 | Vidojevic et al. |
| 8,794,129 B2 | 8/2014 | Cretors |
| 8,869,679 B2 | 10/2014 | Ryan et al. |
| 8,887,626 B2 | 11/2014 | Baker, Jr. |
| 8,899,144 B2 | 12/2014 | Snyder |
| 9,144,247 B2 | 9/2015 | Cretors |
| 9,198,532 B2 | 12/2015 | Barrows et al. |
| 9,408,496 B2 | 8/2016 | Cretors |
| D802,982 S | 11/2017 | Vidojevic |
| 10,136,664 B2 | 11/2018 | Ryan et al. |
| 10,299,499 B2 | 5/2019 | Rhome |
| 2001/0045444 A1* | 11/2001 | Muramatsu ............ H05K 1/116 228/45 |
| 2002/0147006 A1 | 10/2002 | Coon et al. |
| 2002/0166454 A1 | 11/2002 | Weiss et al. |
| 2003/0159591 A1 | 8/2003 | Evans et al. |
| 2003/0168438 A1 | 9/2003 | Zhou |
| 2004/0045444 A1 | 3/2004 | Mann |
| 2004/0045542 A1 | 3/2004 | Zhou et al. |
| 2004/0074397 A1 | 4/2004 | Calhoun |
| 2004/0265993 A1 | 12/2004 | Darling et al. |
| 2005/0056154 A1 | 3/2005 | Fu |
| 2005/0086814 A1 | 4/2005 | Huang |
| 2006/0149415 A1 | 7/2006 | Richards |
| 2009/0041915 A1 | 2/2009 | Biechteler |
| 2009/0056558 A1 | 3/2009 | Cretors et al. |
| 2009/0126579 A1 | 5/2009 | Cretors et al. |
| 2009/0145242 A1 | 6/2009 | Pryor, Jr. et al. |
| 2009/0208621 A1 | 8/2009 | Dotan |
| 2009/0223378 A1 | 9/2009 | Cretors |
| 2010/0270282 A1 | 10/2010 | Fernandez et al. |
| 2011/0014340 A1 | 1/2011 | Spitzley et al. |
| 2011/0027434 A1 | 2/2011 | Cretors et al. |
| 2011/0076372 A1 | 3/2011 | Cretors |
| 2011/0076373 A1 | 3/2011 | Cretors et al. |
| 2011/0120317 A1 | 5/2011 | Rhome |
| 2011/0185914 A1 | 8/2011 | Snyder |
| 2011/0274804 A1 | 11/2011 | Barrows et al. |
| 2012/0266756 A1 | 10/2012 | Cretors |
| 2013/0022727 A1 | 1/2013 | Sherwin |
| 2013/0276640 A1 | 10/2013 | Cretors |
| 2013/0276641 A1 | 10/2013 | Vidojevic |
| 2013/0280386 A1 | 10/2013 | Cretors |
| 2013/0298781 A1 | 11/2013 | Ganuza et al. |
| 2014/0093636 A1 | 4/2014 | Fitzgerald et al. |
| 2014/0311356 A1 | 10/2014 | Daniels |
| 2015/0064320 A1 | 3/2015 | Cretors |
| 2017/0290360 A1 | 10/2017 | Vidojevic |
| 2018/0020864 A1 | 1/2018 | Cretors et al. |
| 2019/0364938 A1* | 12/2019 | Vidojevic ............... A47J 27/62 |

FOREIGN PATENT DOCUMENTS

| | | |
|---|---|---|
| CN | 201701013 U | 1/2011 |
| CN | 203424825 U | 2/2014 |
| CN | 203737561 | 7/2014 |
| DE | 8624682 | 12/1986 |
| DE | 20120429 U1 | 7/2002 |
| EP | 0364071 | 4/1990 |
| FR | 2401387 | 3/1979 |
| GB | 0688223 | 3/1953 |
| GB | 717654 | 10/1954 |
| JP | S59135849 | 8/1984 |
| JP | 2006081587 A | 3/2006 |
| WO | WO-9310698 | 6/1993 |
| WO | WO-9706699 A1 | 2/1997 |
| WO | WO-2004054384 A1 | 7/2004 |
| WO | WO-2012145717 A1 | 10/2012 |

OTHER PUBLICATIONS

Platvoet et al., "Process Burner 101," American Institute of Chemical Engineers; Retrieved on Aug. 19, 2019 from https://www.aiche.org/sites/default/files/cep/20130835.pdf Copyright 2013 (Year: 2013), 5 pages.

International Search Report and Written Opinion received in International Application No. PCT/US20/23702, dated Jun. 9, 2020, 9 pages.

Cretors Coater Mixer Tumbler, http://www.cretors.com/store/catalog.asp?item=39&category_id=3, Copyright 2014, 1 page.

C. Cretors and Co., "Diplomat" product manual for models DI20C, DI32C, DI20F, DI32F, DI205, TDI205, TDI206, DI325 and TDI326; 1996, 58 pages.

C. Cretors and Co., "Diplomat" product manual for models DI20CP, DI32CP, DI20FP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co., "Funfood Equipment & Supplies" catalog; vol. 56, dated 2000, 108 pages.

LOEB Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, 33 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

"How to Succeed in the Caramel Corn Business," Gold Medal Products Company, Copyright 2011, gmpopcorn.com, 24 pages.

\* cited by examiner

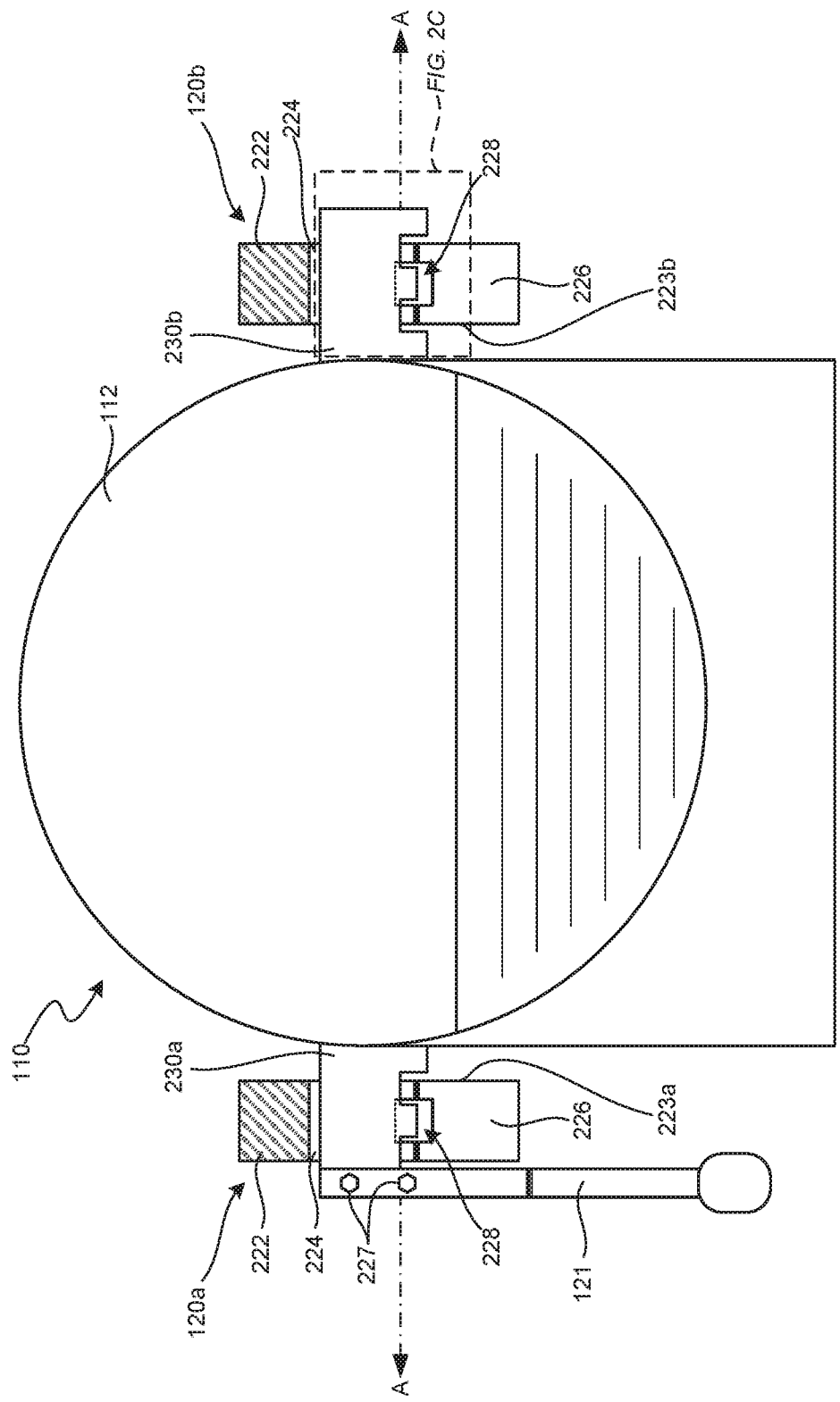

POPCORN MACHINES HAVING REMOVABLE KETTLE ASSEMBLIES

TECHNICAL FIELD

The present disclosure is generally related to popcorn machines and, more particularly, to popcorn machines having kettle assemblies configured to be suspended on a support within a cabinet and easily removed from the support for cleaning, maintenance, repair, and/or replacement.

BACKGROUND

Popcorn machines, such as for concession stand or restaurant use, generally include a cabinet in which the popcorn is both popped and stored. Unpopped corn kernels are loaded into a kettle suspended from a top portion of the popcorn cabinet, combined with cooking oil, and heated. Typically, the kettle is a metal container with an open top and includes electrical or gas heating elements. During a popping operation, the heating elements heat the oil and corn in the kettle to pop the kernels. The kettle can have a lid to cover the kettle during the popping operation and prevent the popcorn from being released until the popping operation is nearly completed. For example, the lid may include a hinged portion that opens as the volume of popcorn increases within the kettle. When the popping operation is complete, the kettle assembly is usually tilted, opening the lid, to release the remaining popcorn into the cabinet.

It is often difficult to access the kettle in conventional popcorn machines for cleaning, maintenance, repair, and/or replacement because the kettle is typically fixedly suspended inside the cabinet. Accordingly, it would be advantageous to provide a popcorn machine having a suspended kettle that is easily removed from the cabinet for cleaning, maintenance, etc.

BRIEF DESCRIPTION OF THE DRAWINGS

FIGS. 2A and 2B are top and side views, respectively, of the kettle assembly and kettle supports of the popcorn machine of FIG. 1 configured in accordance with embodiments of the present technology.

DETAILED DESCRIPTION

Figure 1:
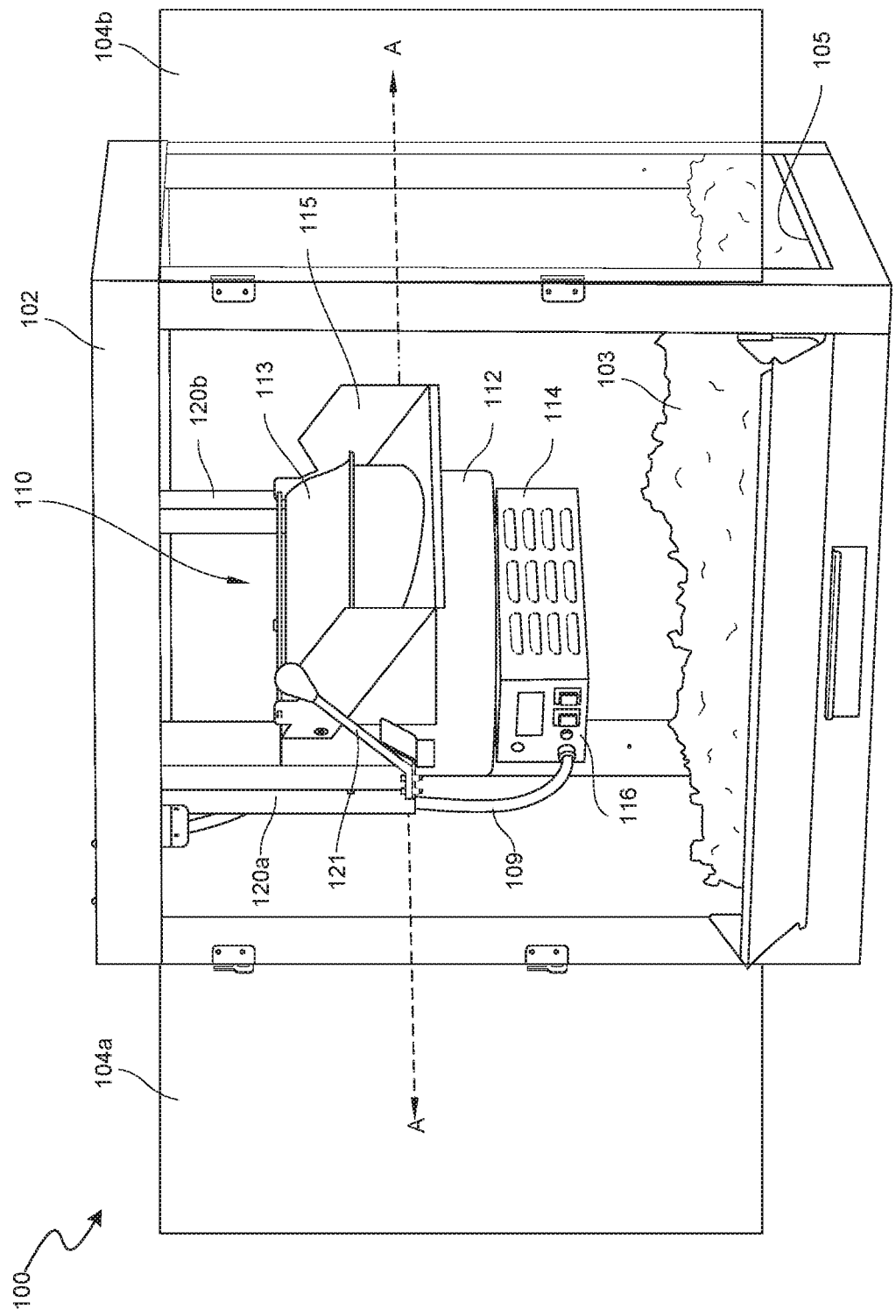
FIG. 1 is a perspective view of a popcorn machine having a kettle assembly configured in accordance with embodiments of the present technology.

The following disclosure describes various embodiments of popcorn machines having a popping kettle assembly configured to be easily removed from a cabinet to, for example, facilitate cleaning, repair, maintenance, and/or replacement of the kettle assembly. In some embodiments, the popcorn machines include a pair of kettle supports mounted to a top wall of a cabinet. The kettle supports support a kettle assembly configured to (a) pop popcorn placed therein when the kettle assembly is in a popping position and (b) discharge the popcorn when the kettle assembly is moved from the popping position to a dumping position. In one aspect of the present technology, the kettle assembly is further configured to be lifted off the kettle supports in the popping position. That is, an operator can simply lift the kettle assembly off the kettle supports to disengage the kettle assembly from the supports and facilitate the removal of the kettle assembly from the cabinet. In another aspect of the present technology, the kettle assembly is configured to stay in the dumping position without requiring the operator to manually hold the kettle assembly in that position (by, e.g., holding a dump handle coupled to the kettle assembly).

Certain details are set forth in the following description and in FIGS. 1-3B to provide a thorough understanding of various embodiments of the present technology. In other instances, well-known structures, materials, operations and/or systems often associated with popcorn machines, electrical circuits for such machines, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a perspective view of a popcorn machine 100 configured in accordance with embodiments of the present technology. In the illustrated embodiment, the popcorn machine 100 includes a kettle assembly 110 positioned in a cabinet 102. The kettle assembly 110 can be electrically connected to an external power source via an electrical cable 109 having a plug (not shown in FIG. 1) that can be plugged into an outlet on an upper wall of the cabinet 102 (obscured in FIG. 1). The cabinet 102 can include cabinet doors 104

(e.g., glass doors, identified individually as a first door 104a and a second door 104b) that swing open to provide access to the kettle assembly 110 and to popped popcorn 103 contained on a lower wall or floor 105 of the cabinet 102. In some embodiments, the popcorn machine 100 can include one or more features that are generally similar to the features of the popcorn machines disclosed in (i) U.S. Pat. No. 6,374,727, titled "POPCORN KETTLE WITH INTEGRATED AGITATOR;" and/or (ii) U.S. Pat. No. 6,872,923, titled "ONE POP POPCORN POPPER;" each of which is incorporated herein by reference in its entirety.

The kettle assembly 110 can include a popping kettle 112 and a base 114. In the illustrated embodiment, a kettle lid 113 is pivotally coupled to the kettle 112 and covers an internal volume of the kettle 112 during operation of the popcorn machine 100 to prevent popped popcorn from being released from the kettle 112 until the popping operation is nearly complete. The base 114 can include one or more heating elements (e.g., electrical heating elements) configured to heat popping oil and unpopped popcorn (corn kernels) placed in the kettle 112 to a temperature sufficient to pop the popcorn, such as a temperature of about 410 to 450 degrees Fahrenheit (F). In some embodiments, the base 114 can include a motor configured to drive an agitator (e.g., a stirring blade; not shown) within the kettle 112 to mix the unpopped popcorn with the popping oil and to ensure even popping of all the popcorn. An operator can operate the kettle assembly 110 and other systems of the popcorn machine 100 by depressing buttons and/or other suitable control features on a control panel 116 on the base 114. Accordingly, the base 114 can include components for controlling the operation of the heating elements, motor, and/or other components of the popcorn machine 100. For example, aspects of the base 114, the control panel 116, and/or other components of the popcorn machine 100 can be embodied in a special purpose computer or data processor that is specifically programmed, configured, or constructed to perform one or more of the operations described in detail herein.

The kettle assembly 110 includes a dump handle 121 and is supported within the cabinet 102 by a pair of kettle supports 120 (identified individually as a first kettle support 120a and a second kettle support 120b) that are mounted to and extend downward from the upper wall of the cabinet 102. As described in greater detail below with reference to FIGS. 2A-3B, the kettle assembly 110 is pivotally/rotatably mounted on the kettle supports 120 and movable between a popping position (as shown in FIGS. 1-2C) and a dumping position (as shown in FIGS. 3A and 3B). For example, once a popping operation is complete, an operator can grasp the dump handle 121 and rotating it downwardly about a pivot axis A. This action rotates the kettle 112 downward in the same direction, thereby dumping any popcorn remaining in the kettle 112 onto the floor 105 of the cabinet 102.

In operation, popping oil and unpopped popcorn of appropriate quantities are placed in the kettle 112, and the operator initiates a popping operation via the control panel 116. As the popcorn pops and fills the kettle 112, it pushes up the lid 113 and spills out over the sides of the kettle 112 and onto the floor 105 of the cabinet 102. In some embodiments, the kettle assembly 110 can include a chute 115 that directs the popped popcorn away from the kettle assembly 110 as it spills out of the kettle 112. At the conclusion of the popping operation, the operator can open one or both of the cabinet doors 104 and empty the kettle 112 of any remaining contents by rotating the dump handle 121 downward about the pivot axis A, as described above.

Figure 2B:
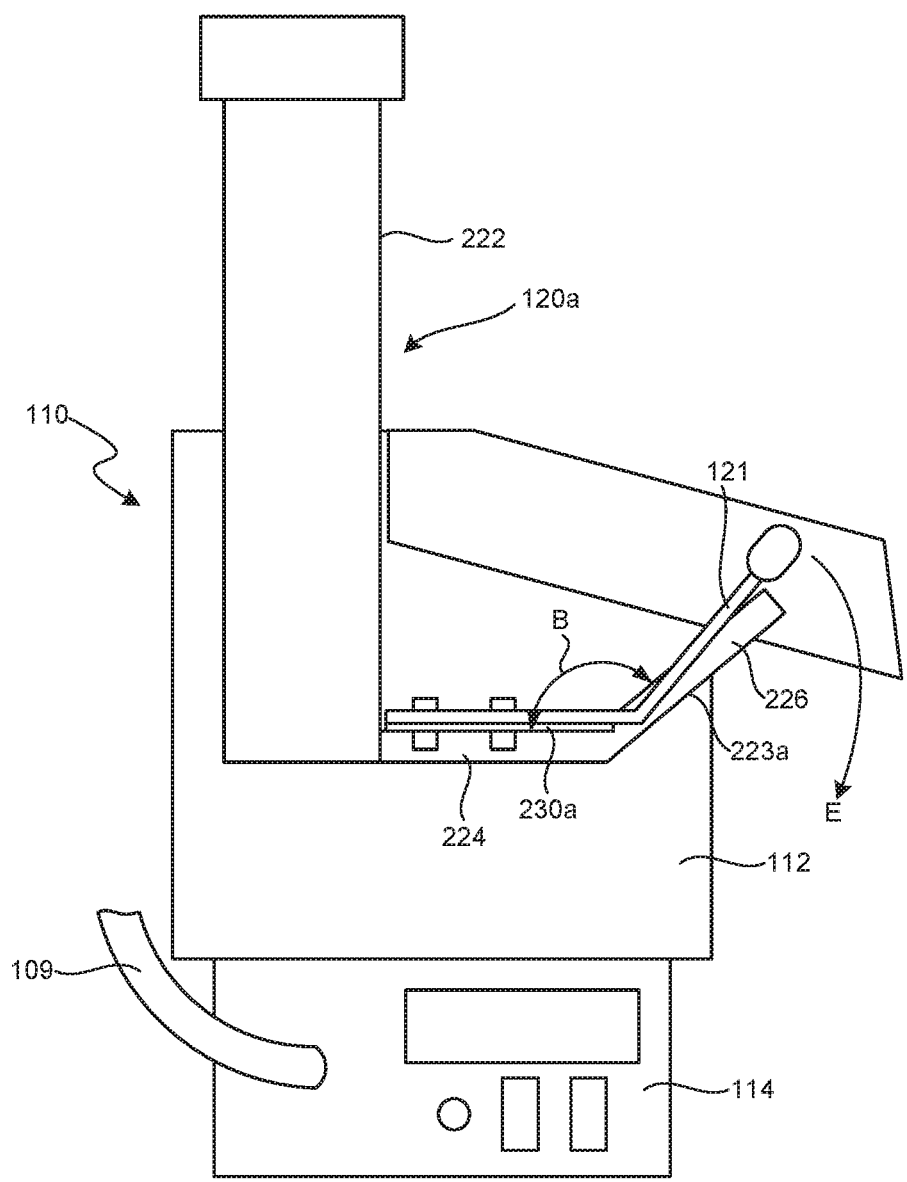
Figure 2C:
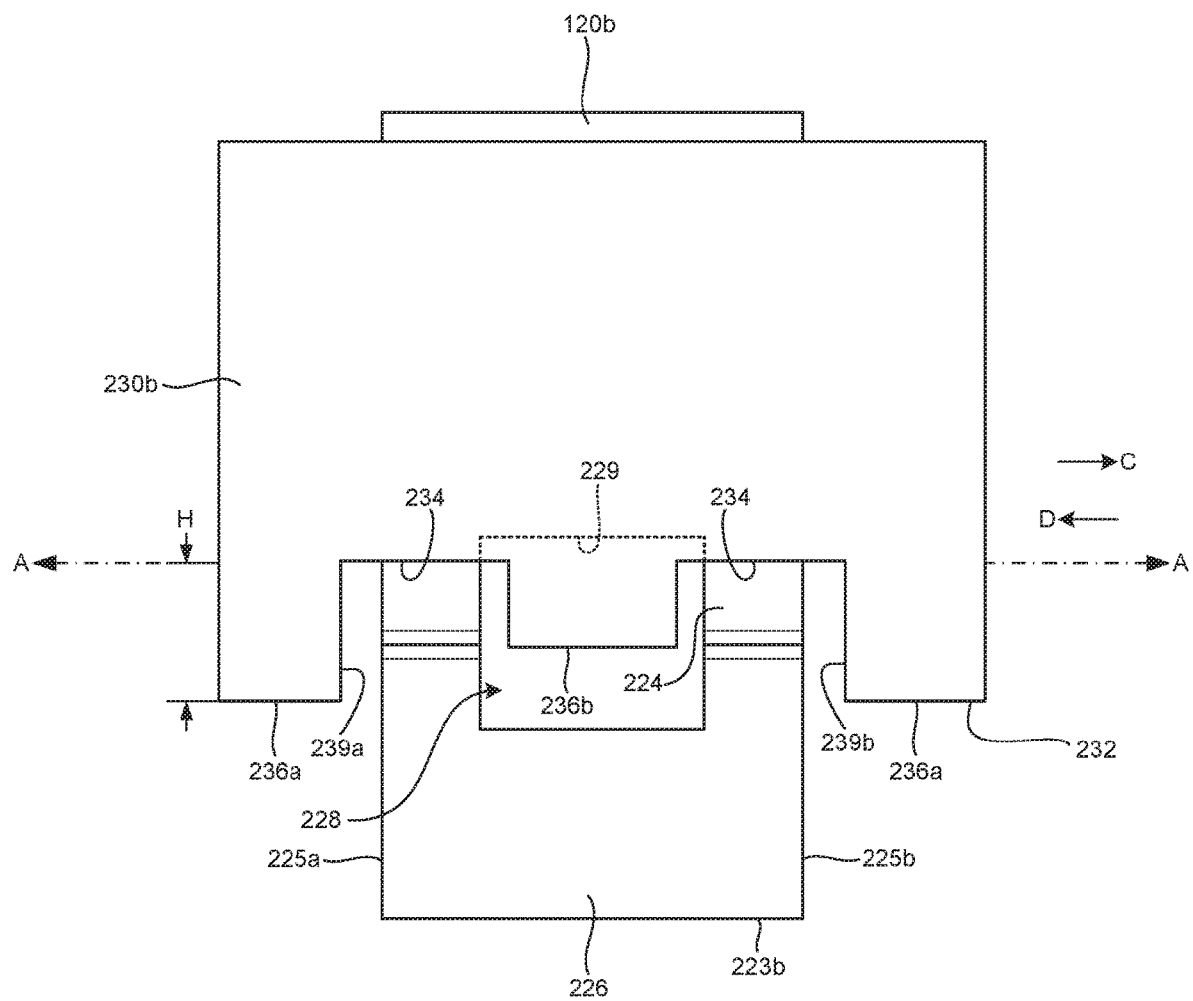
FIGS. 2C and 2D are enlarged top and side isometric views, respectively, of one of the kettle supports of FIG. 2A configured in accordance with embodiments of the present technology.
Figure 3A:
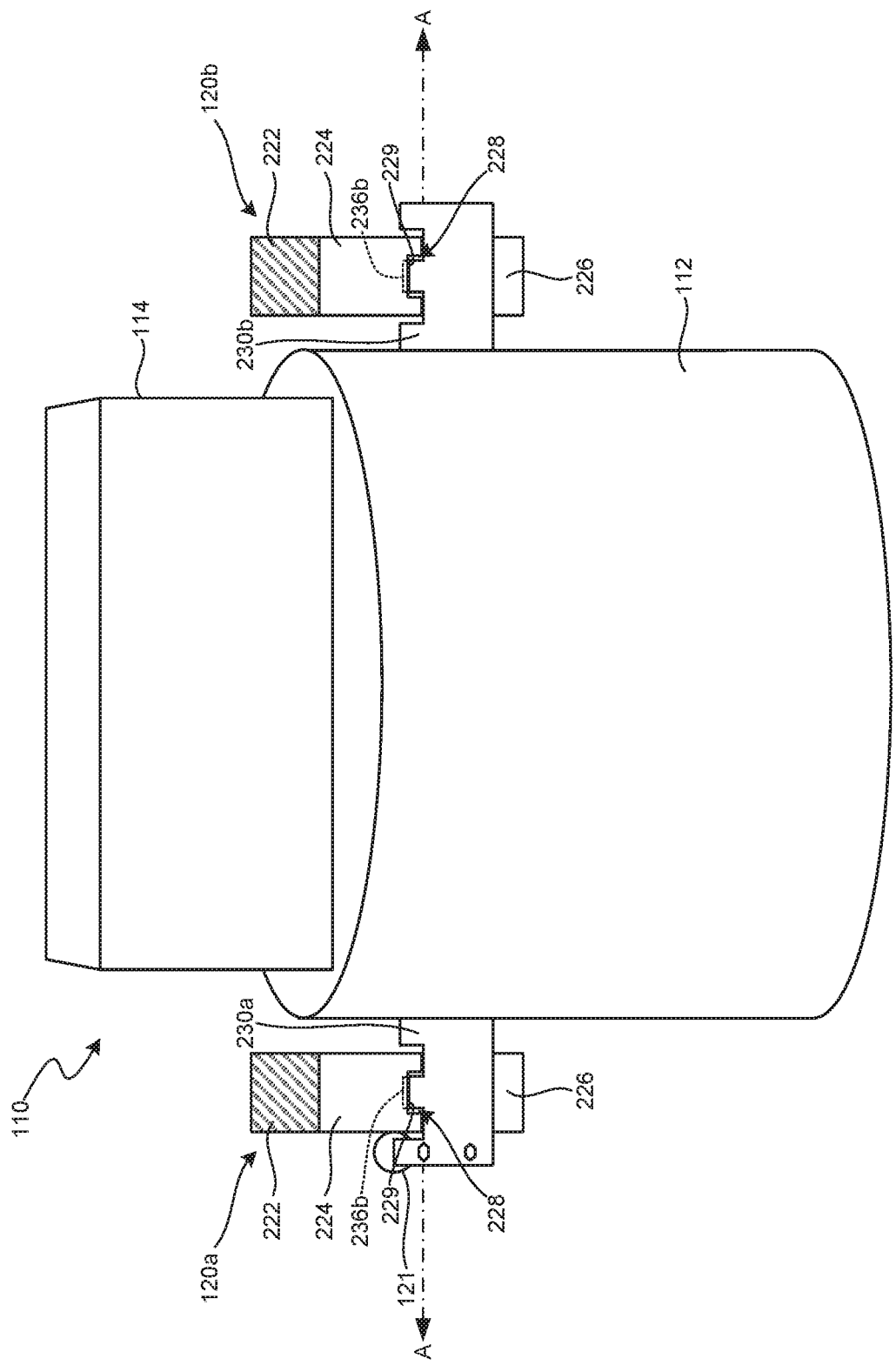
FIGS. 3A and 3B are top and side views, respectively, of the kettle assembly and kettle supports of FIGS. 1-2C shown in a dumping position.
Figure 3B:
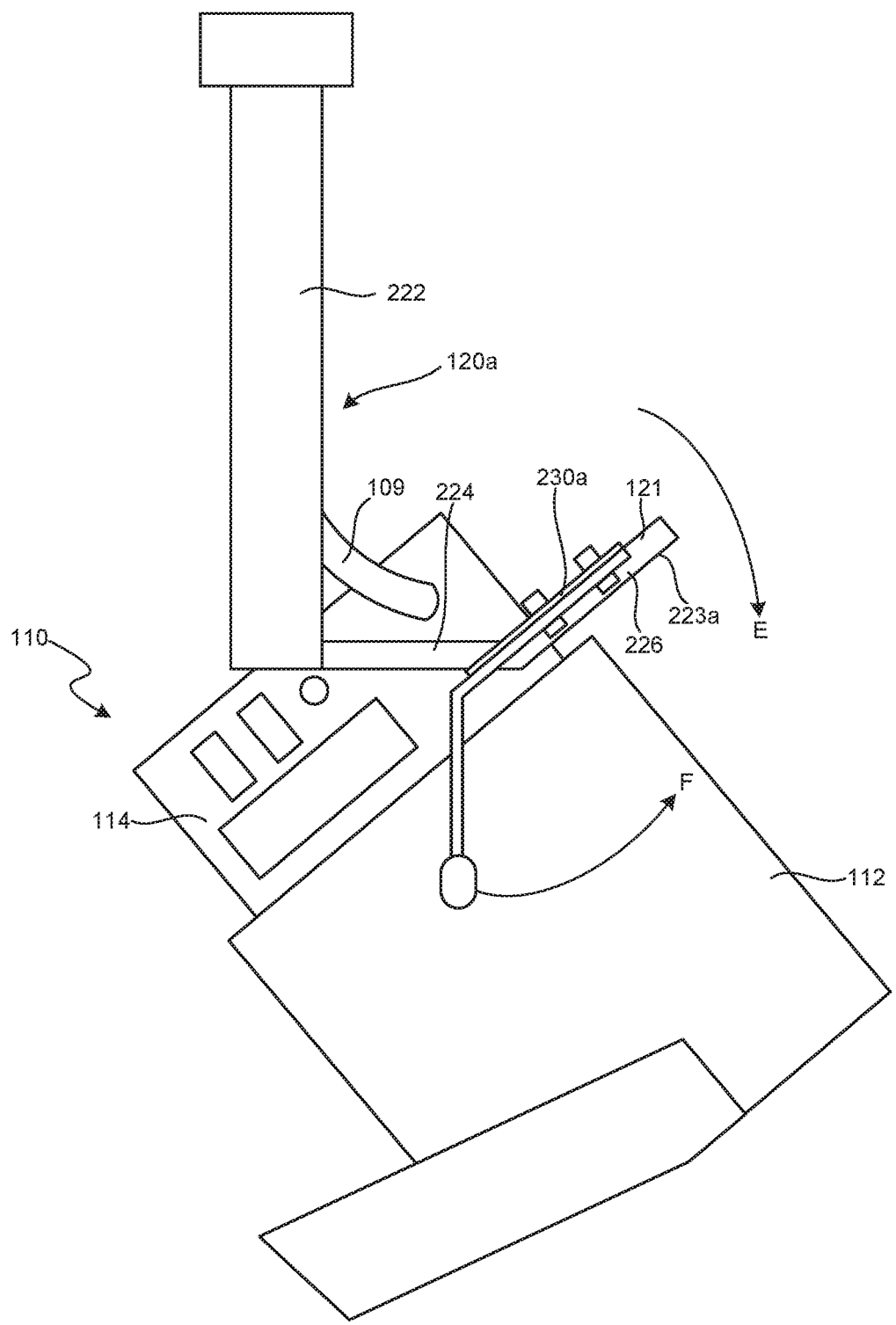

FIGS. 2A and 2B are top and side views, respectively, of the kettle assembly 110 in the popping position on the kettle supports 120 in accordance with embodiments of the present technology. In general, the features and configurations of the kettle supports 120a and 120b can be generally similar or identical. For example, referring to FIGS. 2A and 2B together, the kettle supports 120 can each include a vertical member 222 extending downward from the upper wall of the cabinet 102 (FIG. 1), and a base member 223 (identified individually as a first base member 223a and a second base member 223b) extending outwardly from a lower portion of the vertical member 222. The base member 223 includes a horizontal portion 224 and an angled portion 226. The terms "horizontal," "vertical," "angled," and the like can denote orientations relative to the floor 105 of the cabinet 102 (FIG. 1) and/or a surface on which the popcorn machine 100 is positioned. The members 222, 223 and/or the portions 224, 226 can be integrally formed together (e.g., as a unitary piece) or can be separate components joined together via fasteners (e.g., bolts, screws, rivets, etc.), welded connections, or other suitable means known in the art.

In some embodiments, an angle B between the horizontal portion 224 and the angled portion 226 of the base member 223 can be between about 100°-170° (e.g., between about 110°-130°, or between about 130°-150°, etc.). In a particular embodiment, the angle B is about 120°. In the illustrated embodiment, each of the base members 223 includes an aperture 228 that extends through a portion of the horizontal portion 224 and a portion of the angled portion 226. While the kettle supports 120 are generally identical in FIGS. 2A and 2B, in other embodiments the kettle supports 120 can have different configurations. For example, the horizontal portions 224 and the angled portions 226 can be oriented differently relatively to one another and/or can have different relative lengths, thicknesses, widths, etc. Similarly, in some embodiments only one of the base members 223 (e.g., the first base member 223a) includes an aperture.

In some embodiments, the vertical member 222 of one of the kettle supports 120 can define a channel for receiving the electrical cable 109. The electrical cable 109 can extend through/along the channel in the vertical member 222 to the outlet on the upper wall of the cabinet 102 (FIG. 1) such that the electrical cable 109 does not interfere with the movement of the kettle assembly 110. The electrical cable 109 can be flexible and can have a length that is long enough that the electrical cable 109 remains electrically connected to the base 114 of the kettle assembly 110 and the outlet in the upper wall of the cabinet 102 when the kettle assembly 110 is in the popping position and in the dumping position, and during movement of the kettle assembly 110 between the popping and dumping positions.

In the illustrated embodiment, the kettle assembly 110 further includes a first pivot member 230a is attached to a first side portion of the kettle 112 and configured to engage the first kettle support 120a, and a second pivot member 230b attached to a second side portion of the kettle 112, opposite the first side portion, and configured to engage the second kettle support 120b. When the kettle assembly 110 is in the popping position illustrated in FIGS. 2A and 2B, the pivot members 230 are supported on the horizontal portions 224 of the kettle supports 120. More specifically, a lower surface of the pivot members 230 contacts the horizontal portions 224 of the kettle supports 120. The pivot members 230 together define the pivot axis A of the kettle assembly 110. In the illustrated embodiment, the dump handle 121 is coupled to the first pivot member 230a via fasteners 227.

Figure 2D:
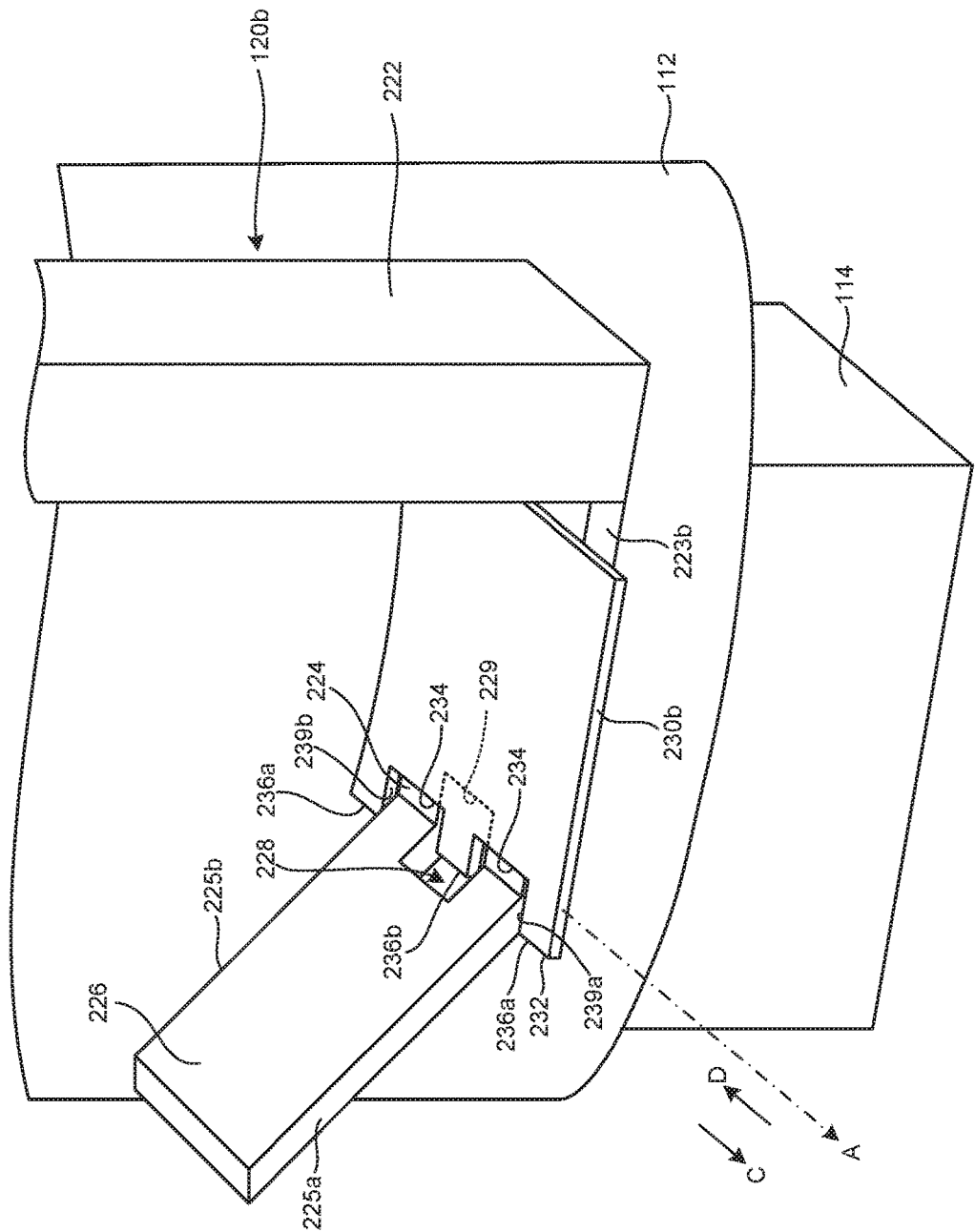

FIGS. 2C and 2D are enlarged top and side isometric views, respectively, of the second pivot member 230b and the second base member 223b of the second kettle support 120b shown in FIG. 2A. Referring to FIGS. 2C and 2D together, the second pivot member 230b includes a forward edge 232 having a nonlinear shape defined by projections 236 (which can also be referred to as "protrusions" or "engagement members"; identified individually as outer projections 236a and an inner projection 236b) separated by corresponding recesses 234. The projections 236 can have the illustrated rectangular shapes, or can have other shapes such as polygonal, curved, triangular, circular, etc.

In some embodiments, some or all of the projections 236 can engage the second base member 223b to facilitate locking/stopping of the kettle assembly 110 in the dumping position. For example, the inner projection 236b can be aligned over the aperture 228 in the second base member 223. When the kettle assembly 110 is rotated from the popping position (shown in FIGS. 1-2D) to the dumping position (shown in FIGS. 3A and 3B), the inner projection 236b rotates downward into the aperture 228 and into contact with a rear edge 229 of the aperture 228. As described in greater detail below, the contact between the inner projection 236b and the rear edge 229 inhibits or even prevents the kettle assembly 110 from sliding or otherwise moving when the kettle assembly 110 is in the dumping position. In the popping position illustrated in FIG. 2C, however, the inner projection 236b does not contact/engage the rear edge 229 or any other portion of the second kettle support 120b.

In some embodiments, some or all of the projections 236 can engage the second kettle support 120b to inhibit lateral (e.g., side-to-side) movement of the kettle assembly 110 along the pivot axis A (FIG. 2A). For example, the outer projections 236a can have a height H (shown in FIG. 2C) that is selected such that the outer projections 236a extend (i) generally horizontally beyond/past the horizontal portion 224 of the second base member 223b and (ii) at least partially adjacent to the angled portion 226. By this arrangement, the outer projections 236a are configured to contact the second base member 223b (e.g., to contact the angled portion 226 of the second base member 223b) when the kettle assembly 110 is moved side-to-side along the pivot axis A (e.g., in response to an operator imparting a lateral force while actuating the dump handle 121). More specifically, for example, a first sidewall 239a of the leftmost one of the outer projections 236a can contact a first edge 225a of the second kettle support 120b when the kettle assembly 110 is moved in a direction C (indicated by the arrow C in FIGS. 2C and 2D) along the pivot axis A to restrict or prevent further movement of the kettle assembly 110 in the direction C. Conversely, a second sidewall 239b of the rightmost one of the outer projections 236a can contact a second edge 225b of the second kettle support 120b when the kettle assembly 110 is moved in a direction D (indicated by the arrow D in FIGS. 2C and 2D) along the pivot axis A to inhibit further movement of the kettle assembly 110 in the direction D.

In this manner, the outer projections 236a can inhibit or prevent the second pivot member 230b from disengaging the second kettle support 120b as the kettle assembly 110 moves laterally, which could otherwise cause the kettle assembly 110 to fall off the kettle supports 120. In some embodiments, the spacing between the projections 236, the size (e.g., height) of the projections 236, the size of the aperture 228, the width (e.g., between the edges 225) of the second kettle support 120b, and/or other aspects of the popcorn machine 100 can be selected to maintain the inner projection 236b over the aperture 228 despite external forces acting along the pivot axis A.

Referring to FIGS. 2A-2D together, the configurations of the pivot members 230 can be generally similar or identical. Accordingly, while the details of the second pivot member 230b are described in detail above with reference to FIG. 2C, one of ordinary skill in the art will understand that the first pivot member 230a can have the same or similar features as the second pivot member 230b (e.g., a forward edge having a non-linear shape configured to engage the first kettle support 120a).

In one aspect of the present technology, the kettle assembly 110 is not fastened or otherwise attached to the kettle supports 120. Rather the kettle assembly 110 is merely positioned on the kettle supports 120 and configured to passively engage the kettle supports 120 in response to external forces (e.g., to inhibit lateral movement of the kettle assembly 110 along the pivot axis A). More specifically, for example, the inner projections 236b of the pivot members 230 do not engage the kettle supports 120 in the popping position. Accordingly, the kettle assembly 110 can be easily lifted off the kettle supports 120 to, for example, facilitate the removal of the kettle assembly from the cabinet 102 (FIG. 1) for cleaning, repair, maintenance, replacement, etc. That is, to remove the kettle assembly 110 from the kettle supports 120 the operator need only grasp the kettle assembly 110 and lift it upward away from the kettle supports 120. Notably, no kettle restraining structures (e.g., screws, bolts, latches, fasteners, etc.) need be removed, nor does the kettle assembly 110 need to be lifted/moved at a specific angle relative to the kettle supports 120 to disengage the kettle assembly 110 therefrom. Put differently, the kettle assembly 110 passively rests on the kettle supports 120 such that it can be lifted off the kettle supports 120 in the popping position without requiring an operator to manually disengage any kettle restraining structures.

FIGS. 3A and 3B are top and side views, respectively, of the kettle assembly 110 in the dumping position on the base members 223 of the kettle supports 120 in accordance with embodiments of the present technology. The operator can rotate the kettle assembly 110 from the popping position (FIGS. 1-2C) to the dumping position by grasping the dump handle 121 and rotating it in the direction E (indicated by arrow E in FIGS. 2B and 3B) about the pivot axis A. When the kettle assembly 110 is in the dumping position illustrated in FIGS. 3A and 3B, the pivot members 230 are supported on the angled portions 226 of the base members 223. More specifically, an upper surface of the pivot members 230 contacts/engages the angled portions 226 of the kettle supports 120.

In one aspect of the present technology, the angle B (FIG. 2B) between the horizontal portions 224 and the angled portions 226 of the kettle supports 120 can be selected such that kettle assembly 110 is rotatably stable in the dumping position shown in FIG. 3B. That is, the base members 223 can be configured so that pivoting the kettle assembly 110 from the popping position (e.g., in which the pivot members 230 contact the horizontal portions 224 of the base members 223) to the dumping position (e.g., in which the pivot members 230 contact the angled portions 226 of the base members 223) moves a center of gravity of the kettle assembly 110 past a vertical plane extending through the pivot axis A, such that the pivot members 230 are pressed against the angled portions 226 of the kettle supports 120 in the dumping position. Accordingly, in one aspect of the present technology the kettle assembly 110 can be maintained/held in the dumping position without requiring that the operator continue applying force to the dump handle 121 and/or without requiring additional locking components (e.g., pins, latches, or other locking mechanisms). Put differently, the kettle assembly 110 passively rests on the base members 223 of the kettle supports 120 such that it stays (e.g., can be stopped) in the dumping position without requiring the operator to manually maintain (e.g., to hold) the kettle assembly in the dumping position. In other embodiments, the kettle supports 120 can be configured such that the kettle assembly 110 is not stable in the dumping position and therefore tends to automatically return to the popping position when the operator releases the dump handle 121.

Moreover, as best seen in FIGS. 3A and 3B, the inner projections 236*b* of the pivot members 230 extend/project into the apertures 228 in the kettle supports 120 and abut/engage the rear edges 229 of the apertures 228. The contact between the inner projections 236*b* and the rear edges 229 can maintain (e.g., lock) the kettle assembly 110 in the dumping position. For example, the contact between the inner projections 236*b* and the rear edges 229 can inhibit or even prevent the pivot members 230 from sliding along the angled portions 226 toward the horizontal portions 224 or otherwise moving out of engagement with the angled portions 226. To return the kettle assembly 110 to the popping position (e.g., to begin another popping operation), the operator can rotate the dump handle 121 in the direction F (indicated by arrow F in FIG. 3B) about the pivot axis A.

In other embodiments, the pivot members 230 and/or the base members 223 of the kettle supports 120 can have other suitable configurations that enable the kettle assembly 110 to be lifted off the kettle supports 120 and/or to be stopped in the dumping position. For example, the angles/orientations of the base members 223 and the pivot members 230 could be varied in proportion to one another to produce the same or a similar effect.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A popcorn machine, comprising:
   a cabinet,
   a pair of kettle supports mounted within the cabinet, wherein the kettle supports each include a base member having horizontal portion and an angled portion extending from the horizontal portion; and a kettle assembly including a pair of pivot members configured to be positioned on corresponding ones of the kettle supports, wherein the kettle assembly is configured to (a) pop popcorn placed therein when the kettle assembly is in a popping position and (b) discharge the popcorn into the cabinet when the kettle assembly is moved from the popping position to a dumping position, wherein the pivot members are positioned on the horizontal portions of the base members when the kettle assembly is in the popping position, wherein the kettle assembly is configured to be lifted off the kettle supports when the kettle assembly is in the popping position without requiring an operator to disengage any kettle restraining structures, wherein the pivot members are positioned on the angled portions of the base members when the kettle assembly is in the dumping position, and wherein the kettle assembly is further configured to stay in the dumping position when moved to the dumpling position without requiring the operator to hold the kettle assembly in the dumping position.

2. The popcorn machine of claim 1 wherein an angle between the horizontal portion and the angled portion of each of the base members is between about 110°–130°.

3. The popcorn machine of claim 1 wherein an angle between the horizontal portion and the angled portion of each of the base members is about 120°.

4. The popcorn machine of claim 1 wherein each of the base members includes an aperture extending therethrough, and wherein the pivot members are configured to engage edge portions of the apertures when the kettle assembly is in the dumping position to maintain the kettle assembly in the dumping position.

5. The popcorn machine of claim 1 wherein at least one of the pivot members includes an edge with a nonlinear shape.

6. The popcorn machine of claim 5 wherein the edge has alternating projections separated by recesses.

7. The popcorn machine of claim 6 wherein the kettle assembly is configured to pivot about a pivot axis between the popping position and the dumping position, and wherein at least one of the projections is configured to contact the corresponding one of the kettle supports when the kettle assembly is moved laterally along the pivot axis to inhibit further lateral movement of the kettle assembly along the pivot axis.

8. The popcorn machine of claim 6 wherein at least one of the projections is configured to (a) be aligned over an aperture in the corresponding one of the kettle supports when the kettle assembly is in the popping position and (b) engage an edge portion of the aperture when the kettle assembly is in the dumping position to stop the kettle assembly in the dumping position.

9. The popcorn machine of claim 1 wherein the kettle assembly includes a kettle and a base, wherein the kettle is configured to receive the popcorn, and wherein the base includes one or more heating elements configured to heat the kettle to pop the popcorn therein.

10. The popcorn machine of claim 1 wherein the kettle assembly includes a kettle configured to receive the popcorn, and wherein the pivot members are coupled to the kettle at opposite portions of the kettle.

11. A popcorn machine, comprising, a cabinet;

a first kettle support and second kettle support mounted within the cabinet, wherein the kettle supports each include a base member having a horizontal portion and an angled portion extending from the horizontal portion; and a kettle assembly having a first pivot member configured to engaged the first kettle support and a second pivot member configured to engage the second kettle support, wherein at least the first pivot member includes an engagement member, wherein the kettle assembly is rotatable from a popping position in which the kettle assembly is configured to pop popcorn placed therein to a dumping position in which the kettle assembly is configured to discharge the popcorn into the cabinet, wherein the pivot members are positioned on the horizontal portions of the base members when the kettle assembly is in the popping position, wherein the pivot members are positioned on the angled portions of the base members when the kettle assembly is in the dumping position, and wherein the engagement member is configured to engage the first kettle support when the kettle assembly is in the dumping position to stop the kettle assembly in the dumping position without requiring an operator to manually maintain the kettle assembly in the dumping position.

12. The popcorn machine of claim 11 wherein the engagement member does not engage the first kettle support when the kettle assembly is in the popping position.

13. The popcorn machine of claim 11 wherein the first kettle support includes an aperture, and wherein the engagement member projects into the aperture when the kettle assembly is in the dumping position.

14. The popcorn machine of claim 13 wherein the engagement member is aligned over the aperture when the kettle assembly is in the popping position.

15. The popcorn machine of claim 11 wherein the engagement member is a first engagement member, wherein the second pivot member includes a second engagement member, and wherein the second engagement member is configured to engage the second kettle support when the kettle assembly is in the dumping position to stop the kettle assembly in the dumping position.

16. The popcorn machine of claim 11, further comprising a dump handle coupled to the first pivot member, wherein the dump handle is configured to be grasped and rotated by the operator to rotate the kettle assembly from the popping position to the dumping position.

17. The popcorn machine of claim 11 wherein the kettle assembly includes a kettle configured to receive the popcorn, and wherein the pivot members are coupled to the kettle at opposite portions of the kettle.

18. A method of operating a popcorn machine having a kettle assembly, the kettle assembly having a pair of pivot members configured to be positioned on corresponding kettle supports, the method comprising:

popping popcorn in a kettle of the kettle assembly when the kettle assembly is in a popping position, wherein the kettle supports each include a base member having a horizontal portion and an angled portion extending from the horizontal portion, wherein the pivot members are positioned on the horizontal portions of the base members when the kettle assembly is in the popping position, and wherein the kettle assembly is configured to be lifted off the kettle supports in the popping position without requiring an operator to disengage any kettle restraining structures;

rotating the kettle assembly from the popping position to a dumping position to discharge the popcorn from the kettle, wherein the pivot members are positioned on the angled portions of the base members when the kettle assembly is in the dumping position; and stopping the kettle assembly in the dumping position without the operator holding the kettle assembly in the dumping position.

19. The method of claim 18, further comprising:

after discharging the popcorn from the kettle, rotating the kettle assembly from the dumping position to the popping position; and lifting the kettle assembly off the kettle supports to facilitate cleaning or maintenance of the kettle assembly without the operator manually disengaging any kettle restraining structures.

20. The method of claim 18 wherein the pivot members are coupled to the kettle at opposite portions of the kettle.

* * * * *